US008961638B2

(12) United States Patent
Paul

(10) Patent No.: US 8,961,638 B2
(45) Date of Patent: Feb. 24, 2015

(54) DOOR ASSEMBLY FOR DUST-COLLECTING APPARATUS

(75) Inventor: Patrick M. Paul, Canton, GA (US)

(73) Assignee: Dustex Corporation, Kennesaw, GA (US)

( * ) Notice: Subject to any disclaimer, the term of this patent is extended or adjusted under 35 U.S.C. 154(b) by 304 days.

(21) Appl. No.: 13/408,677

(22) Filed: Feb. 29, 2012

(65) Prior Publication Data

US 2013/0220132 A1   Aug. 29, 2013

(51) Int. Cl.
*B01D 50/00*   (2006.01)

(52) U.S. Cl.
USPC ............... 55/385.2; 55/361; 55/379; 55/380; 55/480; 55/502

(58) Field of Classification Search
USPC ............... 55/385.2, 361, 379, 480, 502, 510; 96/428; 49/463
See application file for complete search history.

(56) References Cited

U.S. PATENT DOCUMENTS

| | | | |
|---|---|---|---|
| 2,661,811 A | 12/1953 | Kautz | |
| 3,726,066 A | 4/1973 | Colley et al. | |
| 3,839,850 A | 10/1974 | Jamiol | |
| 3,951,627 A | 4/1976 | Barr, Jr. et al. | |
| 4,955,996 A | 9/1990 | Edwards et al. | |
| 4,976,756 A | 12/1990 | Dobyns et al. | |
| 5,062,867 A | 11/1991 | Klimczak | |
| 5,222,276 A * | 6/1993 | Glenn, III | 15/333 |
| 5,395,409 A * | 3/1995 | Klimczak et al. | 55/302 |
| 5,421,846 A | 6/1995 | Klimczak | |
| 2008/0110141 A1 | 5/2008 | Brock et al. | |

FOREIGN PATENT DOCUMENTS

| | | |
|---|---|---|
| DE | 1197736 B | 7/1965 |
| WO | WO-97/26976 A1 | 7/1997 |

OTHER PUBLICATIONS

Jet III® Pulse Jet Dust Collectors; Wheelabrator Air Pollution Control Inc., A Siemens Company; Copyright 2005.
Destex, Inc. Filter Bags for Industry; downloaded at http://www.destexinc.com/filterbags.htm on Feb. 10, 2012; pp. 1-4.
International Search Report and Written Opinion for Application No. PCT/US2013/028241, dated May 7, 2013.

* cited by examiner

*Primary Examiner* — Robert Clemente
*Assistant Examiner* — Karla Hawkins
(74) *Attorney, Agent, or Firm* — Alston & Bird LLP

(57) ABSTRACT

A dust-collecting apparatus is described that includes a lift-off door assembly that provides access to the interior of the dust-collecting apparatus while minimizing the adverse effects on the normal operation of the apparatus by maintaining a proper seal between the interior and the exterior of the apparatus. In particular, the lift-off door assembly includes a top plate, a door frame, and a bottom plate. The top plate is secured to the door frame. Lift clips are provided about a perimeter of the bottom plate and are secured to the bottom plate. Lifting ends of the lift clips are positioned over an outer portion of the door frame, such that when a lifting force is applied to the top plate, the top plate, door frame, and bottom plate are lifted together via the lift clips to move the lift-off door assembly from the closed position to the open position.

7 Claims, 7 Drawing Sheets

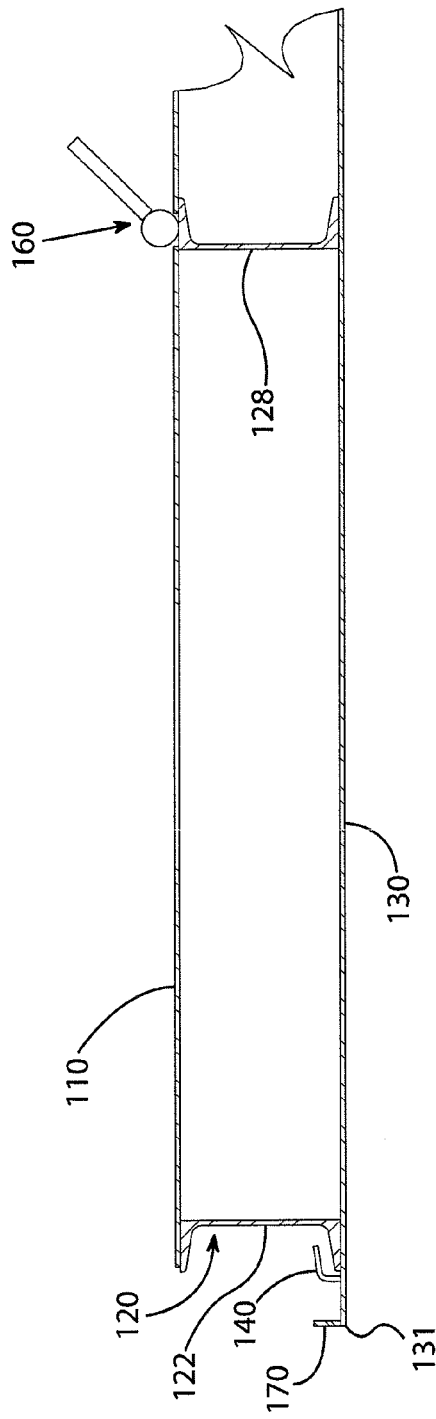

DOOR ASSEMBLY FOR DUST-COLLECTING APPARATUS

FIELD OF THE INVENTION

The present invention relates generally to systems and apparatuses for collecting dust using a dust-collecting housing, as well as systems and apparatuses for accessing an interior of the housing.

BACKGROUND

Conventional self-cleaning dust collectors of the described type typically comprise a sheet metal housing that is divided by a transverse panel having a plurality of rows of openings therein, and so that the panel defines a lower air inlet chamber and an upper air outlet chamber. Cylindrical filter elements, such as fabric filter bags or cartridge filters, are mounted so as to be in registry with the openings and depend downwardly into the inlet chamber. In operation, the dust-laden air enters the inlet chamber, the entrained particles are deposited on the outside surfaces of the filter bags, and the filtered air flows upwardly through the inside of the bags and is discharged through the upper outlet chamber.

Such dust-collecting apparatuses are typically installed at industrial and manufacturing facilities where there is a need to remove dust and other contaminants from the air. Facilities where dust collection is typically required include power and steam generation sites, cement manufacturing sites, iron and steel mills, mining facilities, chemical and petro-chemical facilities, and glass manufacturing sites, among others. From time to time, access to the interior of the dust-collecting apparatus may be required, such as to perform inspections and maintenance.

Accordingly, there is a need in the art for systems and apparatuses that can provide access to the interior of a dust-collecting apparatus in a simple and cost-effective manner without adversely affecting the operation of the apparatus.

BRIEF SUMMARY OF EXAMPLE EMBODIMENTS

Accordingly, embodiments of systems and apparatuses for dust-collecting are described that include a door assembly designed to allow for safe access to be provided to the interior of a dust-collecting housing and, at the same time, minimize the adverse effects on the normal operation of the dust-collecting apparatus by allowing for a proper seal to be maintained between the interior and the exterior of the housing. In some embodiments, a dust-collecting apparatus is provided that includes a housing having a transverse panel dividing the housing into an inlet chamber and an outlet chamber, with the panel having a plurality of openings therein, and a plurality of elongate filter elements each having an open end and a closed end, with the filter elements being mounted to the panel such that the open ends are in registry with respective ones of the openings in the panel and the filter elements extend into the inlet chamber. The apparatus may further include a reverse pulse cleaning apparatus configured for periodically directing a reverse pulse of air through each of the panel openings and into the open ends of each of the filter elements and may also include a lift-off door assembly disposed above the outlet chamber of the housing.

The lift-off door assembly may comprise a top plate, a door frame, a bottom plate, and a plurality of lift clips. The top plate may be disposed above the door frame and may be attached thereto. The bottom plate may be disposed below the door frame, and the lift clips may be disposed around a perimeter of the bottom plate and may be attached thereto. A portion of the door frame may be configured to engage the lift clips when the top plate is subjected to a lifting force such that the lifting force causes the lift-off door assembly, including the bottom plate, to be lifted together.

In some cases, the door frame may comprise two pairs of opposite side frame members, and adjacent side frame members may be attached at their respective ends. The side frame members may comprise channel beams. The door frame may further comprise a plurality of interior frame members disposed substantially parallel to and between one of the two pairs of opposite side frame members, and an end of each interior frame member may be attached to a respective side frame member of the other of the two pairs of opposite side frame members.

The lift clips may, in some cases, be distributed substantially equally around the perimeter of the bottom plate. Furthermore, each lift clip may extend upward and inward such that a lifting end of each lift clip is positioned over an outer portion of the door frame, and the outer portion of the door frame may be configured to engage the lift clips when the top plate is subjected to the lifting force. In some cases, a strengthening bar may be attached to an outer edge of the bottom plate and may be configured to resist curling thereof.

In other embodiments, a lift-off door assembly may be provided for use in a dust-collecting apparatus. The lift-off door assembly may comprise a top plate, a door frame, a bottom plate, and a plurality of lift clips. The top plate may be disposed above the door frame and may be attached thereto. The bottom plate may be disposed below the door frame, and the lift clips may be disposed around a perimeter of the bottom plate and may be attached thereto. A portion of the door frame may be configured to engage the lift clips when the top plate is subjected to a lifting force such that the lifting force causes the lift-off door assembly, including the bottom plate, to be lifted together.

In some cases, the door frame may comprise two pairs of opposite side frame members. The side frame members may comprise channel beams. The door frame may further comprise a plurality of interior frame members disposed substantially parallel to and between one of the two pairs of opposite side frame members.

The lift clips may be distributed substantially equally around the perimeter of the bottom plate. Each lift clip may extend upward and inward such that a lifting end of each lift clip is positioned over an outer portion of the door frame, and the outer portion of the door frame may be configured to engage the lift clips when the top plate is subjected to the lifting force. A strengthening bar may, in some cases, be attached to an outer edge of the bottom plate and may be configured to resist curling thereof.

BRIEF DESCRIPTION OF THE DRAWINGS

Figure 1:
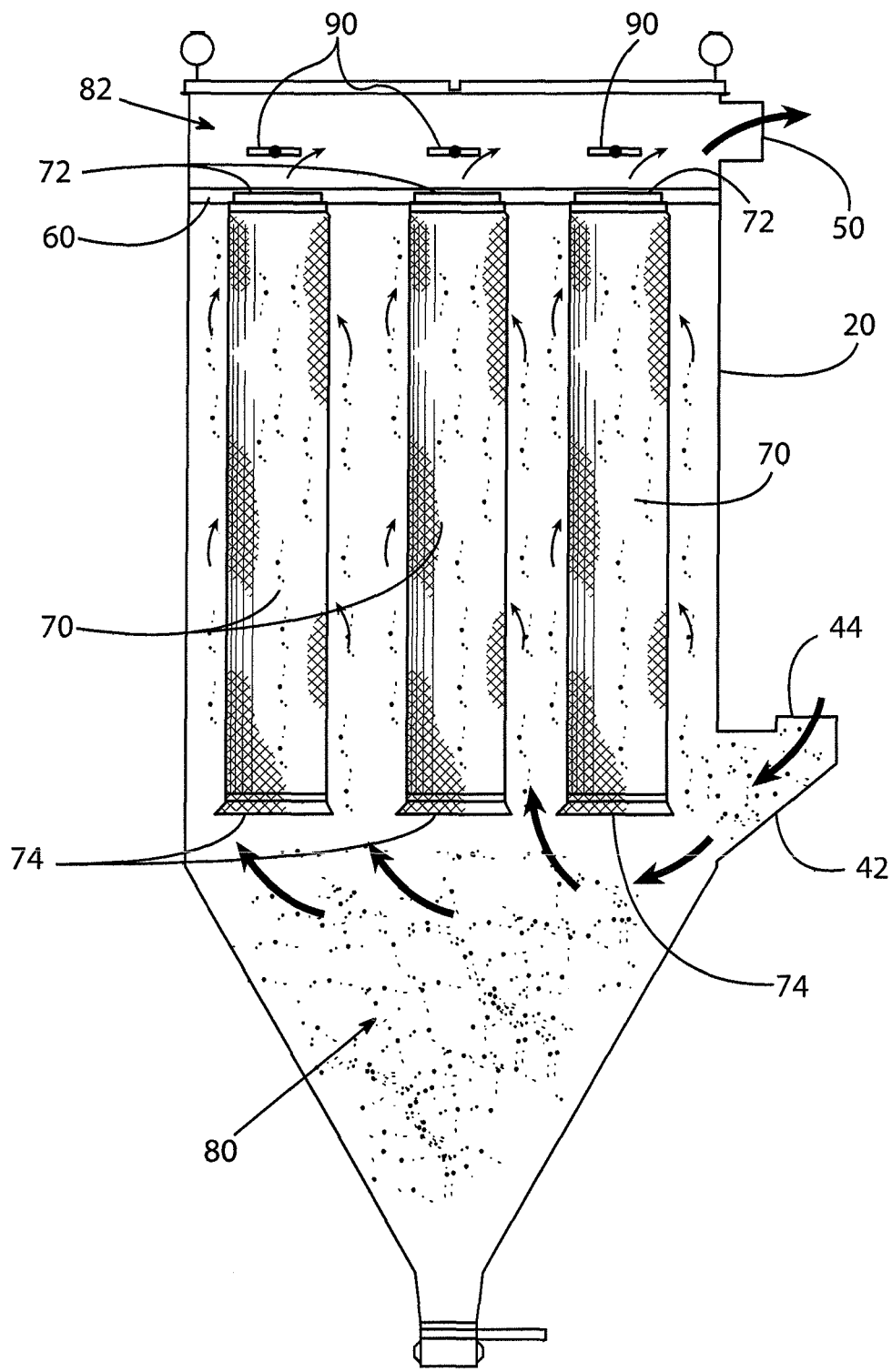
Figure 2:
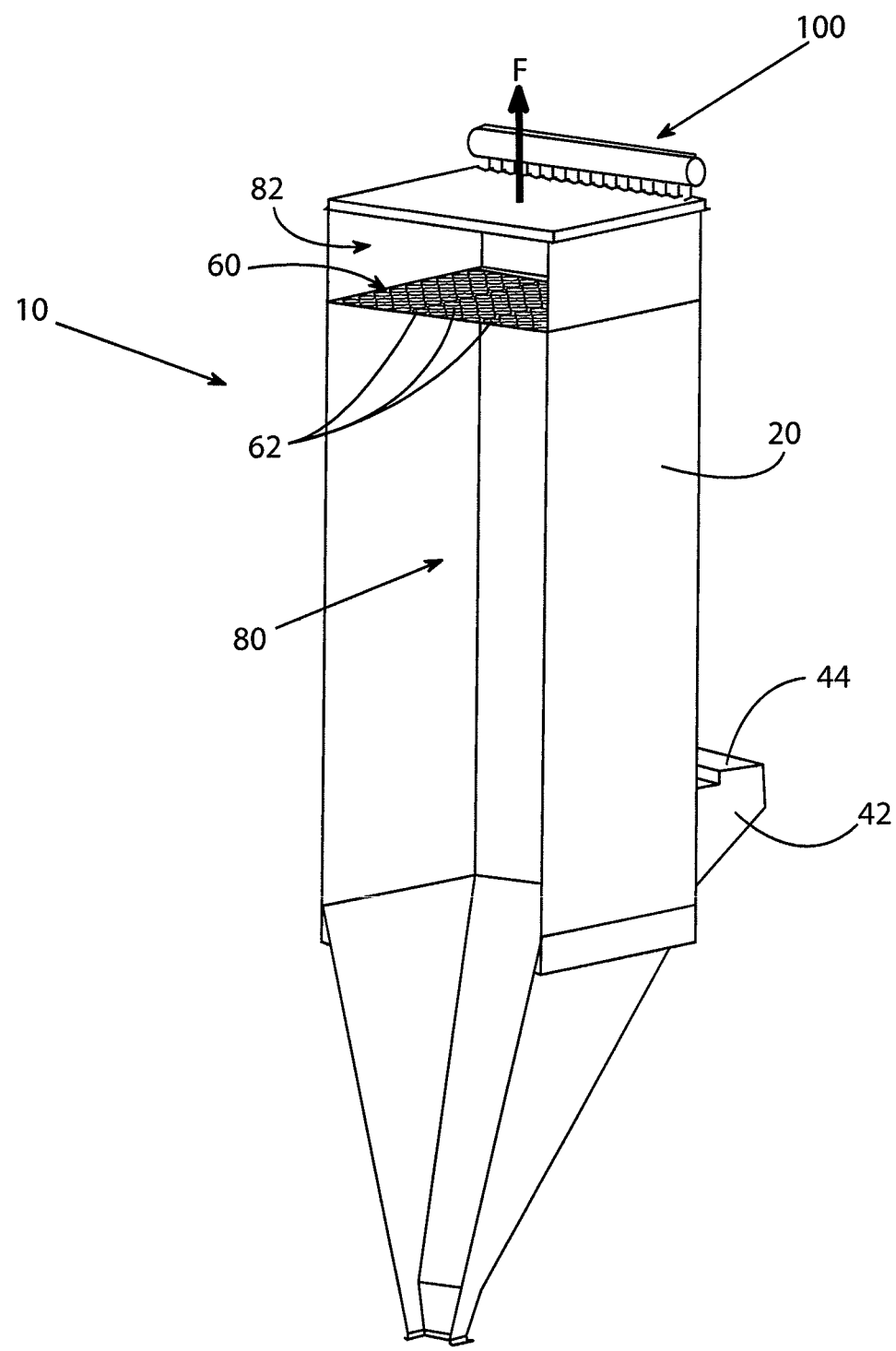
Figure 3:
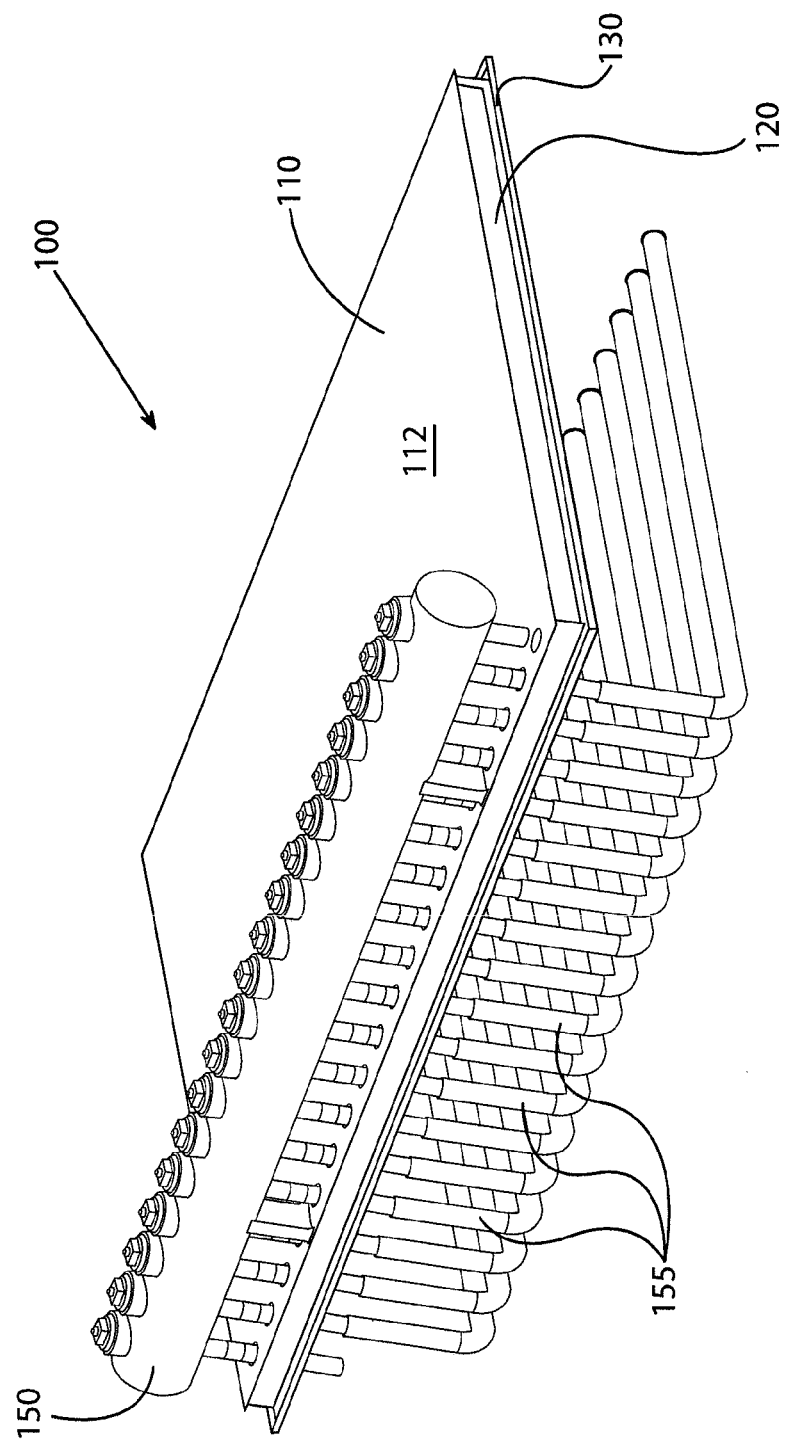
Figure 4:
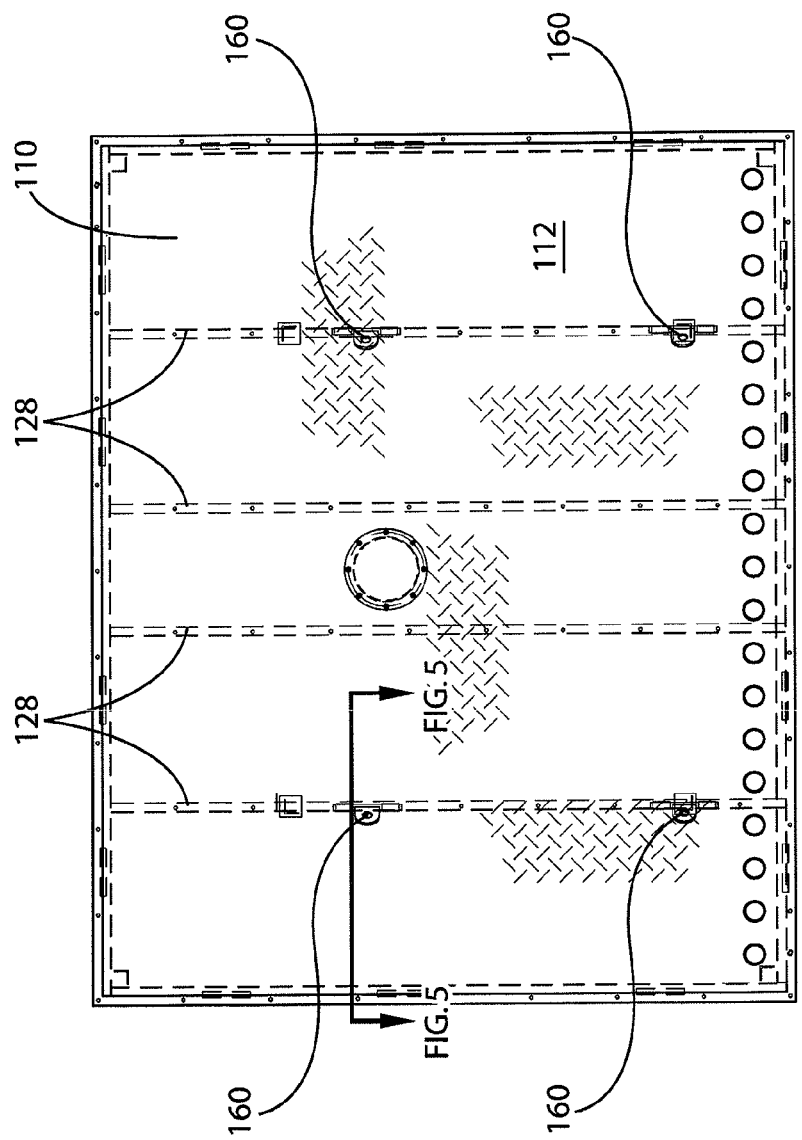
Figure 6:
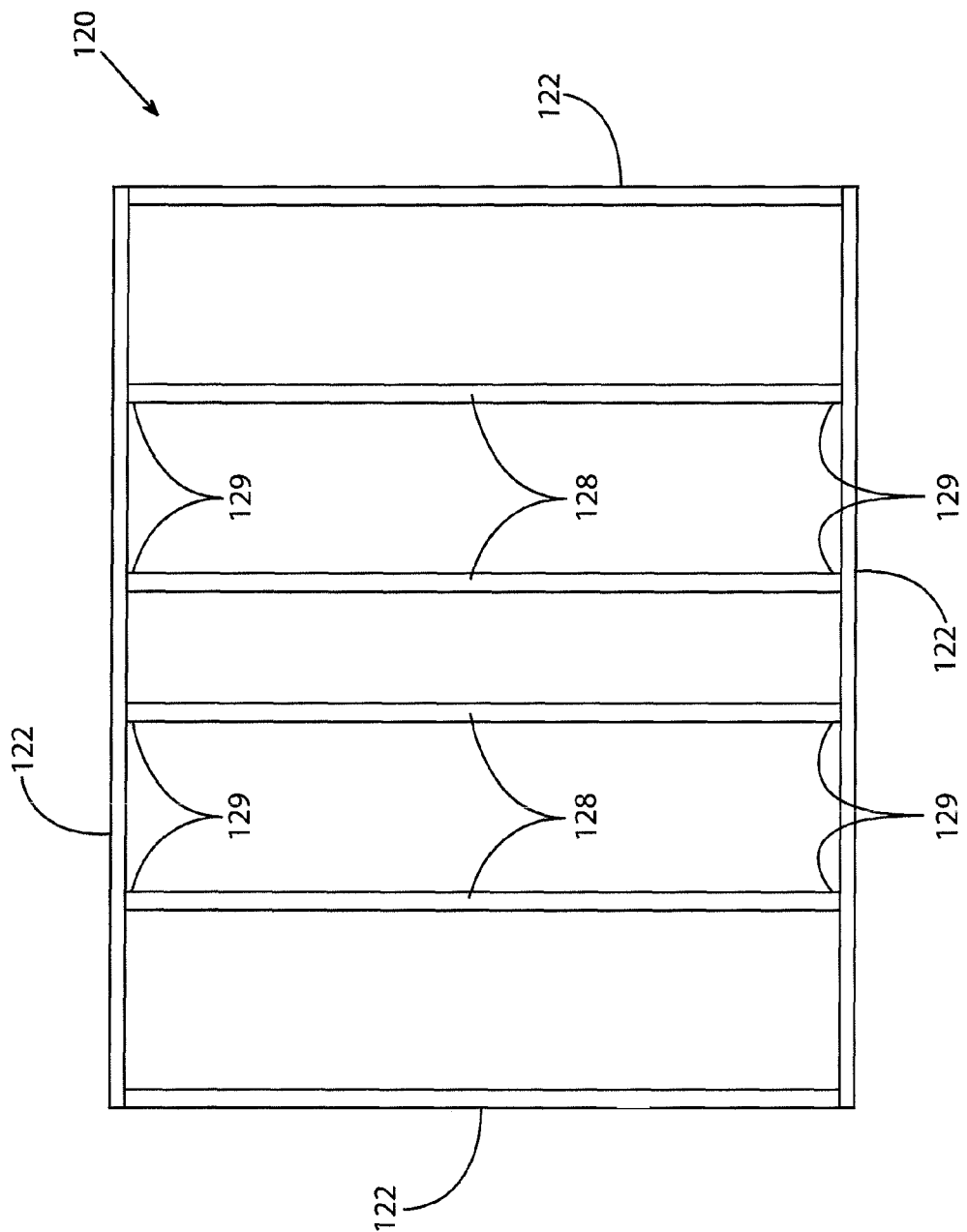
Figure 7:
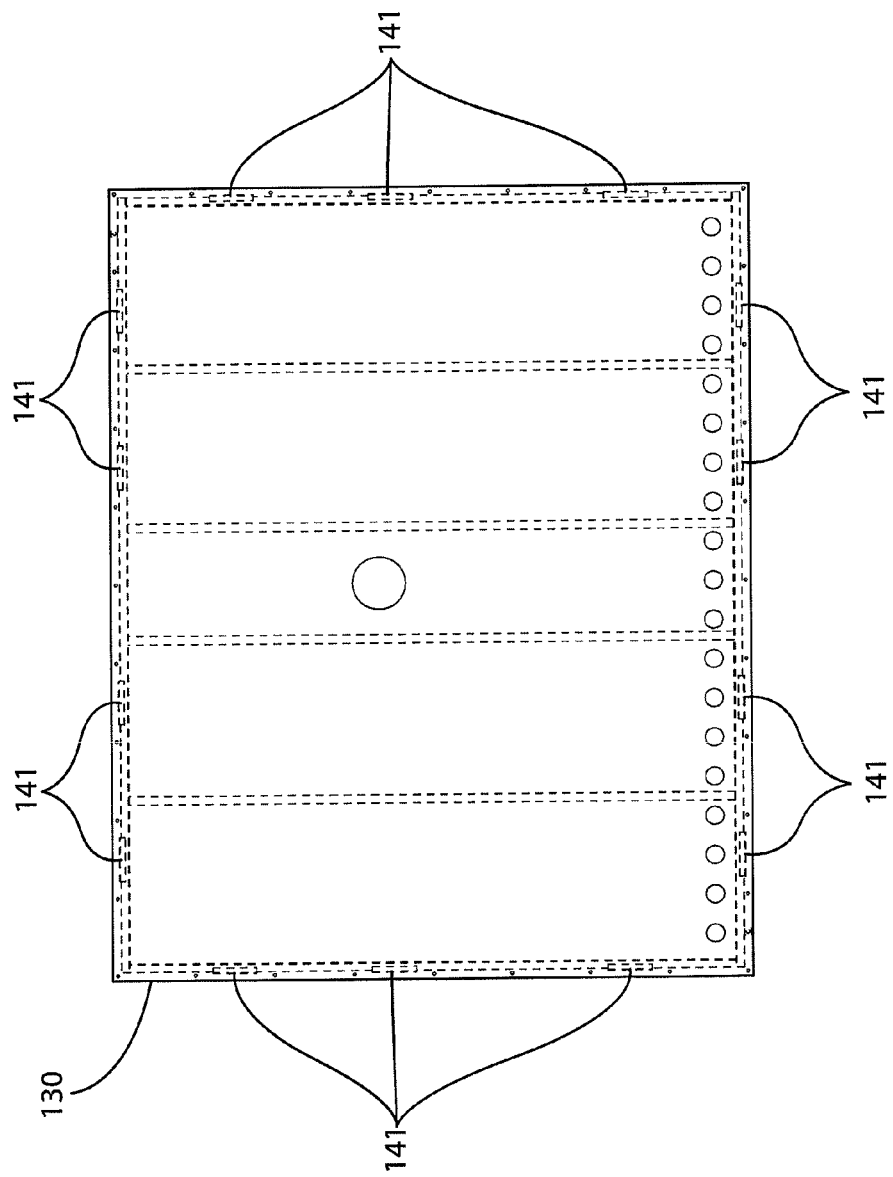

Having thus described the invention in general terms, reference will now be made to the accompanying drawings, which are not necessarily drawn to scale, and wherein:

FIG. 1 shows a simplified schematic representation of a cross-section of a dust-collecting apparatus including elongate filter elements in accordance with an exemplary embodiment of the present invention;

FIG. 2 shows a simplified perspective view of the interior of a dust-collecting apparatus in accordance with an exemplary embodiment of the present invention;

FIG. 3 shows a perspective view of a lift-off door assembly in accordance with an exemplary embodiment of the present invention, with the lift clips removed;

FIG. 4 shows a top view of the lift-off door assembly from an exterior of the dust-collecting apparatus looking down at the top face of a top plate of the lift-off door assembly in accordance with an exemplary embodiment of the present invention;

FIG. 5 shows a cross-sectional view of a portion of the lift-off door assembly of FIG. 4 in accordance with an exemplary embodiment of the present invention;

FIG. 5A shows a close-up cross-sectional view of a lift clip and a side frame member of FIG. 5 when the lift-off door assembly is in a closed position in accordance with an exemplary embodiment of the present invention;

FIG. 5B shows a close-up cross-sectional view of the lift clip and the side frame member of FIG. 5A when the lift-off door assembly is in an open position in accordance with an exemplary embodiment of the present invention;

FIG. 6 shows a top view of a door frame of the lift-off door assembly in accordance with an exemplary embodiment of the present invention; and FIG. 7 shows a bottom view of the lift-off door assembly of FIG. 5 from an interior of the dust-collecting apparatus looking up at the bottom plate of the lift-off door assembly in accordance with an exemplary embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the dust-collecting apparatus and associated systems are not shown in one or more of the figures for clarity and to facilitate explanation of embodiments of the present invention.

As used herein, the terms "bottom," "top," "upper," "lower," "inner," "outer," and similar terms are used for ease of explanation and refer generally to the position of certain components of embodiments of the described invention in the installed configuration (e.g., in an operational configuration). It is understood that such terms are not used in any absolute sense, and, as such, a component described as a "lower portion" may be on the same level (e.g., at the same distance from the ground) as another component described as an "upper portion" in certain configurations of embodiments of the described invention, such as when the apparatus is being transported to the installation site or is not yet fully assembled or installed. Moreover, in the description and examples provided herein, the term "dust" is used to refer to any particulates or contaminants in the air or any other gas stream that are capable of being removed to some degree via mechanical or physical separation, such as by using one or more filters.

Conventional dust-collecting apparatuses are structures that hold one or more filters. On a very basic level, these structures are arranged such that dust-laden air may be directed into one end of the apparatus and moved through the filters where the dust (or some percentage of the dust) is removed. The cleaned air may then be exhausted from another end of the structure, for example, for safe release into the environment.

With reference to FIG. 1, for example, a simplified illustration of a dust-collecting apparatus 10 is provided that includes a plurality of elongate filter elements 70. Although FIG. 1 shows a row of three filter elements 70, embodiments of the present invention may have several rows each having 15 to 30 or more filter elements. The housing 20 of the dust-collecting apparatus 10 may have a transverse panel 60 dividing the housing into an inlet chamber 80 and an outlet chamber 82. The transverse panel 60 may define a plurality of openings 62 therein (shown in FIG. 2). In some cases, the housing 20 may define an inlet extension 42 having an opening 44, and the dust-laden air may enter the inlet chamber 80 of the housing via the opening of the inlet extension.

Each of the elongate filter elements 70 may have an open end 72 and a closed end 74, and the filter elements may be mounted to the transverse panel 60 such that the open ends are in registry with respective ones of the openings 62 in the panel. The filter elements 70 may extend into the inlet chamber 80, such that as the dust-laden air is passed through the filter elements, the dust is caught on an outside surface of the filter elements and clean air is moved up through the filter elements and into the outlet chamber 82 via the respective open ends 72 of the filter elements and the corresponding openings 62 of the transverse panel 60. The clean air may then be exhausted from the outlet chamber 82 via the outlet opening 50.

In some cases, a reverse pulse cleaning apparatus 90 may be provided that is configured for periodically directing a reverse pulse of air through each of the panel openings 62 and into the open ends 72 of the respective filter elements 70. The reverse pulse of air may serve to dislodge dust particles caught on the outer surface of the filter elements and allow the particles to fall to the bottom of the inlet chamber, where they may be collected and removed, thereby "cleaning" the filter elements 70 and allowing more dust to be captured by the respective filter elements. A reverse pulse cleaning apparatus is described, for example, in U.S. Pat. No. 5,395,409, the contents of which are hereby incorporated by reference.

To maintain the proper operation of the dust-collecting apparatus 10, such as to ensure that a sufficient volume and rate of airflow is processed by the apparatus and that dust is removed from the air to an acceptable level, certain components located within the housing 20 may need to be inspected and/or serviced by authorized personnel. The large size of some housings 20 (which may be upwards of 40 feet tall and approximately 10 feet deep by 20 feet wide or more), coupled with the difference in air temperature within the housing as compared to the external temperature due to normal operating conditions and the need to maintain an adequate seal on any access opening when not in use, however, may present additional challenges that are not addressed by conventional dust-collecting apparatuses.

Accordingly, embodiments of the present invention provide for a dust-collecting apparatus that includes a door assembly designed to allow for safe access to be provided to the interior of the housing 20 and, at the same time, minimizes the adverse effects on the normal operation of the apparatus by allowing for a proper seal to be maintained between the interior and the exterior of the housing.

Referring now to FIGS. 2 and 3, a simplified view of a lift-off door assembly 100 in accordance with embodiments of the present invention is shown, with some of the components removed for purposes of explanation. In general, the lift-off door assembly 100 may be disposed above the outlet chamber 82 of the housing 20 and may provide access to the outlet chamber when a lifting force F is applied to the lift-off door assembly to move the door assembly out of contact with the walls of the housing. For example, in some embodiments, the lift-off door assembly 100 may be configured to seal the outer chamber 82 based on the weight of the door assembly (which may be in excess of 6000 pounds) resting on the walls of the housing 20, rather than due to any physical attachment of the door assembly to the walls. In other embodiments, however, the lift-off door assembly may be attached at one or more locations to corresponding portions of the housing, such as via a hinge or latch mechanism.

With reference to FIG. 3, the lift-off door assembly 100 may include a top plate 110, a door frame 120, and a bottom plate 130 that are configured to be lifted together to provide access to the interior of the housing via lift clips 140 (shown in FIG. 5), as described below. In some cases, additional components may be attached to or otherwise supported by the lift-off door assembly 100, such as a header 150 and associated piping 155 for providing air at high pressures for cleaning of the filters 70 via the reverse pulse cleaning apparatus 90 shown in FIG. 1 and described above. For example, as shown in FIG. 3, the header 150 may be supported on a top (exterior) face 112 of the top plate 110, and one or more sections of piping 155 may extend from the header, through the top and bottom plates 110, 130, and into the outer chamber 82 for providing the reverse pulse of air through each of the panel openings 62 and into the open ends 72 of the respective filter elements 70.

FIG. 4 illustrates a top view of the lift-off door assembly 100 (e.g., from an exterior of the dust-collecting apparatus looking down at the top face 112 of the top plate 110 of the lift-off door assembly), and FIG. 5 illustrates a cross-sectional view of a portion of the lift-off door assembly 100. With reference to FIGS. 4 and 5, the top plate 110 may be disposed above the door frame 120 and may be attached to the door frame, such as via welding. In this regard, the door frame 120, which is shown in FIG. 6, may comprise two pairs of opposite side frame members 122, with adjacent side frame members being attached at their respective ends to form a perimeter portion of the door frame 120. In the depicted embodiment, each side frame member 122 may be a channel beam (shown in FIGS. 5 and 5A) that includes an upper portion 124, a lower portion 126, and a main portion 125 extending therebetween. Accordingly, in some embodiments, the upper portion 124 of each side frame member 122 may be attached to a corresponding face of the top plate 110, such as via welding, whereas the lower portion 126 may remain independent of the bottom plate 130, such that the bottom plate is free to move with respect to the side frame members 122 and the top plate, as described in greater detail below.

In some cases, the lift-off door assembly 100 may further include a plurality of interior frame members 128. In the depicted embodiment, for example, four interior frame members 128 are provided; however, the number of interior frame members may vary based on the particular configuration of the lift-off door assembly (e.g., the size and weight of the door assembly), among other considerations. The interior frame members 128 may be disposed substantially parallel to and between one of the two pairs of opposite side frame members 122. In some embodiments, an end 129 of each interior frame member 128 may be attached to a respective side frame member 122 of the other of the two pairs of opposite side frame members (e.g., the side frame members that are oriented substantially perpendicularly to the interior side frame members), such as via welding. In this way, the door frame 120 may form a rigid framework for supporting the top plate 110 and distributing the weight of the top plate across the surface of the bottom plate 130.

Each of the interior frame members 128 may be attached to a corresponding portion of the top plate 110, such as via welding. As noted above with respect to the side frame members 122, one or more of the interior frame members 128 may comprise channel beams, such as that shown in FIG. 5A. One or more of the top plate 110, bottom plate 130, and door frame 120 may be made of metal, such as steel.

In some embodiments, the top plate 110 and the bottom plate 130 may be connected in a central area of the respective plates, while leaving the outer regions of the respective plates independent from each other. For example, an inspection hatch or other central structure may be provided that extends through and/or between the top plate 110, the door frame 120, and the bottom frame 130, which may assist in transferring a lifting force applied to the top plate to the bottom plate while allowing the outer edge of the bottom plate to move (e.g., expand and contract) with respect to the side frame members and the top plate, as described in greater detail below.

FIG. 7 illustrates a bottom view of the lift-off door assembly 100 (e.g., from an interior of the dust-collecting apparatus looking up at the bottom plate 130 of the lift-off door assembly. Referring to FIGS. 5 and 7, a plurality of lift clips 140 may thus be provided for facilitating the transfer of a lifting force F applied to the top plate 110 (shown in FIG. 2) to the bottom plate 130. The lift clips 140 may also be made of steel or other metal in some embodiments. The lift clips 140 may be disposed at locations 141 around a perimeter of the bottom plate 130 and may be attached to the bottom plate, such as via welding. A portion of the door frame 120 may be configured to engage the lift clips 140 when the top plate 110 is subjected to a lifting force F such that the lifting force causes the lift-off door assembly 100, including the bottom plate 130, to be lifted together to move the lift-off door assembly from the closed position (in which the door assembly is in contact with the housing) to an open position (in which the door assembly is at least partially separated from the housing and provides access to the interior of the housing). For example, in the embodiment depicted in FIG. 7, the locations 141 of the lift clips 140 are arranged such that the lift clips are distributed substantially equally around the perimeter of the bottom plate 130.

Turning again to FIG. 5, in some embodiments, each lift clip may extend upward (e.g., toward the top plate 110) and inward (e.g., toward a center of the lift-off door assembly 100), such that a portion of each lift clip is positioned over an outer portion of the door frame 120. In this way, the outer portion of the door frame 120 may be configured to engage the lift clips 140 when the top plate 110 is subjected to the lifting force described above. For example, in the depicted embodiment in which the door frame includes side frame members 122 comprising channel beams, as shown in FIGS. 5A and 5B, each lift clip 140 may include a lifting end 142 that is spaced from the lower portion 126 of the corresponding side frame member 122 when the lift-off door assembly 100 is in the closed position and the top plate 110 and door frame 120 are resting against the bottom plate 130 due to the force of gravity (FIG. 5A). When the top plate 110 is subjected to the lifting force (e.g., via lifting lugs 160 shown in FIGS. 4 and 5), however, the door frame 120, by virtue of its attachment to the top plate 110, is caused to move away from the bottom plate 130 by a distance d until the lower portion 126 of the side frame member 122 makes contact with the lifting end 142 of the respective lift clip 140 (FIG. 5B). Accordingly, the engagement of the lift clip 140 with the door frame 120 (e.g., via the side frame members 122 as described above) serves to lift the bottom plate 130 along with the top plate 110 and the door frame 120 as the lifting force continues to be applied to the top plate to move the entire lift-off door assembly 100 up and away from the housing of the dust-collecting apparatus.

By providing lift clips 140 to transfer the lifting force F (shown in FIG. 2) from the top plate 110 to the bottom plate 130 via the door frame 120, it is possible to move the lift-off door assembly 100 as a unit between the closed position and the open position for providing access to the interior of the housing of the dust-collecting assembly 10 without necessitating that the bottom plate be attached to the door frame or the top plate at least at a perimeter region of the bottom plate. In this way, the outer edge of the bottom plate 130 is allowed to expand and contract relative to the top plate 110, for example as a result of differences in temperature between the interior of the housing of the dust-collecting apparatus and the exterior (e.g., ambient) environment. In contrast, conventional door assemblies that do not allow for independent movement as between a portion of the door that is exposed to the operating environment within the housing and a portion of the door that is exposed to the external environment may experience warping or other distortion around the perimeter of the door, which may adversely affect the seal that is applied by the door to the outer chamber and, as a result, may adversely affect the performance of the dust-collecting apparatus.

In this regard, in some embodiments, the dust-collecting apparatus may further comprise a strengthening bar 170 that is attached (e.g., via welding) to an outer edge 131 of the bottom plate 130 and is configured to resist curling or other distortion of the outer edge, as shown in FIG. 5. The strengthening bar 170 may, for example, be attached substantially perpendicularly to the bottom plate 130, as shown. The strengthening bar 170 may be attached, for example, around at least a portion of the outer edge 131 of the bottom plate 130, or, in some cases, may be extended about an entire perimeter of the outer edge, such that the strengthening bar forms a lip or rim around the outer edge. The strengthening bar 170 may thus add rigidity to the outer edge 131 of the bottom plate 130, such that curling or other distortion of the outer edge (e.g., due to thermal expansion and contraction) may be resisted.

Although in the depicted embodiment and the examples provided above the lift-off door assembly comprises a single bottom plate, door frame, and top plate, in some embodiments the lift-off door assembly comprises two or more lift-off door portions, where each lift-off door portion comprises a bottom plate, a door frame, and a top plate. For example, a first portion of the lift-off door may be embodied as described and shown with respect to FIG. 3, and a second portion of the lift-off door may be embodied as described with respect to FIG. 3, but without the header 150 or the piping 155. The two portions may be configured to form a seal along respective adjacent edges, such that in the closed position the outer chamber of the housing is enclosed and sealed via the two lift-off door portions. The lift-off door portions may, in some cases, be configured to move from the closed position to the open position independently from each other.

As noted above, the structures and components depicted in the figures have been simplified for clarity and ease of explanation. As such, one or more of the housing walls, internal and/or external ductwork, filter elements, etc., although described above, may not be shown in the figures. In addition, many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A dust-collecting apparatus comprising:
   a housing having a transverse panel dividing the housing into an inlet chamber and an outlet chamber, with the panel having a plurality of openings therein;
   a plurality of elongate filter elements each having an open end and a closed end, with the filter elements being mounted to the panel such that the open ends are in registry with respective ones of the openings in the panel and the filter elements extend into the inlet chamber;
   a reverse pulse cleaning apparatus configured for periodically directing a reverse pulse of air through each of the panel openings and into the open ends of each of the filter elements; and
   a lift-off door assembly disposed above the outlet chamber of the housing, the lift-off door assembly comprising a top plate, a door frame, a bottom plate, and a plurality of lift clips,
   wherein the top plate is disposed above the door frame and is attached thereto, the bottom plate is disposed below the door frame, and the lift clips are disposed around a perimeter of the bottom plate and are attached thereto, wherein the bottom plate is configured to be movable relative to the door frame, and wherein a portion of the door frame is configured to engage the lift clips when the top plate is subjected to a lifting force such that the lifting force causes the lift-off door assembly, including the bottom plate, to be lifted together.

2. The dust-collecting apparatus of claim 1, wherein the door frame comprises two pairs of opposite side frame members, wherein adjacent side frame members are attached at their respective ends.

3. The dust-collecting apparatus of claim 2, wherein the side frame members comprise channel beams.

4. The dust-collecting apparatus of claim 2, wherein the door frame further comprises a plurality of interior frame members disposed substantially parallel to and between one of the two pairs of opposite side frame members, wherein an end of each interior frame member is attached to a respective side frame member of the other of the two pairs of opposite side frame members.

5. The dust-collecting apparatus of claim 1, wherein the lift clips are distributed substantially equally around the perimeter of the bottom plate.

6. The dust-collecting apparatus of claim 1, wherein each lift clip extends upward and inward such that a lifting end of each lift clip is positioned over an outer portion of the door frame, and wherein the outer portion of the door frame is configured to engage the lift clips when the top plate is subjected to the lifting force.

7. The dust-collecting apparatus of claim 1, further comprising a strengthening bar attached to an outer edge of the bottom plate and configured to resist curling thereof.

* * * * *